United States Patent Office 3,512,988
Patented May 19, 1970

3,512,988
STABILIZING BEER
Harugoro Yomo, 35 Kitagosho-cho, Okazaki, Sakyo-ku, and Hironobu Iinuma, 1 Hirookadani, Gokasho, Uji, both of Kyoto, Japan
No Drawing. Filed July 11, 1967, Ser. No. 652,403
Claims priority, application Japan, July 15, 1966, 41/46,492
Int. Cl. C12h 1/14
U.S. Cl. 99—48                               8 Claims

ABSTRACT OF THE DISCLOSURE

A method of stabilizing beer through the utilization of a compound prepared by adding polyoxethylene to a condensation product of alkylphenol and formaldehyde thereby overcoming formation of a non-biological haze.

---

The invention relates to a method of preventing formation of non-biological haze in beer, that is, a method of stabilizing beer, by the use of a compound prepared by adding polyoxyethylene to a condensation product of alkylphenol and formaldehyde.

In general, beer forms a non-biological haze (including permanent haze and chill haze) which, in turn, detracts from its commercial value. In order to prevent this, use has been made of antioxidants such as ascorbic acid, proteases such as papain, or tannin adsorbing agents such as nylon and polyvinyl pyrrolidone. However, these materials are either ineffective, or so expensive so that they are not completely satisfactory from the viewpoint of industrial use.

We have found that the product resulting from addition of polyoxyethylene to a condensation product of alkylphenol and formaldehyde is highly effective in preventing non-biological haze. Such substance, hereinafter referred to as PEGPS, is known for example, as disclosed in detail in U.S. patent specification No. 2,454,541 and Reports of the Japanese Government Chemical Industrial Research Insittute, 58th (No. 7), p. 339. PEGPS is a high molecular weight compound which contains polyethylene glycol residue in its molecule nad is easily soluble in water and is usually surface active. PEGPS may be obtained by passing ethylene oxide at 50° C.–200° C. in the presence of a small amount of catalyst through an anhydrous solution of a high molecular weight alkylphenol-formaldehyde condensation product.

The invention is characterized in adding a small effective amount of PEGPS to beer or unmatured beer which is in process of after-fermentation, whereby formation of non-biological haze can be greatly suppressed. The results of adding this substance in different concentrations to samples of matured beer are shown in Table 1.

TABLE 1

| Concentrations of PEGPS add μ g./ml.: | Relative haze of beer |
|---|---|
| 0 | 100 |
| 20 | 45 |
| 50 | 30 |
| 200 | 20 |
| Concentration of papain added, 30 μ g./ml. | 55 |

Thus, haze is decreased with increasing the concentration of added PEGPS, and it is evident that formation of non-biological haze can be prevented by the present method. The effectiveness thereof is higher than that of papain. As hereinafter described, PEGPS does not impair head retention and other qualities of beer, it is non-toxic and is less expensive than papain so that it is very economical in use.

Although the functional mechanism of PEGPS is not completely known, it is evident that it is not attributable simply to the solubilization action of surface active chemicals, since that surface active chemicals do not always act as a haze-preventive.

In the present invention, we have discovered that PEGPS is capable of acting to prevent a haze in beer.

As to the polyoxyethylene addition product from alkylphenol-formaldehyde condensation product, high molecular weight compounds, used in the invention, those which have the following general formula are suitable:

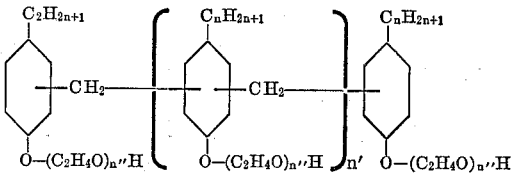

where $n$ is an integer having a value of 4 or above and preferably from 8 to 18; $n'$ is an integer greater than 1 and preferably from 2 to 20; and $n''$ is an integer greater than 7 and preferably from 10 to 40. It is also requested that $n''$ be always great enough to assure that the obtained compound is soluble in water. The optimum values of $n$, $n'$ and $n''$ would be within the ranges of 8 to 9, 4 to 10 and 10 to 20, respectively.

Some examples for preparing the polyoxyethylene addition product from alkylphenol-formaldehyde condensation product are given as follows:

Example A

This is one which is described in the "Reports of the Japanese Government Chemical Industrial Research Institute," 58th (No. 7), pp. 340–342. 110 g. of nonyl phenol, 15 g. of paraformaldehyde, 1 g. of paratoluene-sulfonic acid and 150 ml. of toluene are mixed together, heated and circulated. The resulting water is driven off. After 12 hours' heating with the final reaction temperature of 230° C., it is dried by vacuum evaporation and filtered and has added thereto benzene to increase the total volume thereof to 500 ml. and then cooled to 5° C. 600 ml. of methanol at 5° C. is then added while stirring. Over water bath, the liquid resinous component in the lower layer is heated for melting and left to be cooled to room temperature and the lower layer is separated and discarded. Similarly, 250 ml. of methanol is added to the upper layer, followed by separating, heating and cooling, the lower layer being separated. Then 300 ml. of methanol is added to the upper layer, followed by separating, heating and cooling. The resinous component formed is water-free and filtered. Solvent is evaporated over water bath. Drying is effected at 65° C. in vacuum.

10 g. of the product thus obtained is dissolved in 30 g. of xylene, followed by the addition of 0.1 g. of sodium metal at a temperature of 120° C. Thereafter, fully dried ethylene oxide is blown into it in such a way that 20 moles of ethylene oxide is added per mole of alkylphenol residue. The additive amount of ethylene oxide has been adjusted in accord with an increase in weight. Most of the solvent is driven off by means of extraction process (ether and n-hexane) and the product is then vacuum-dried at 65° C. The product is easily soluble in water and acted as a surface active agent.

Example B

This is one which is described in U.S. Patent specification No. 2,454,541. An octyl phenol-formaldehyde condensate was prepared by heating a mixture of 206 g. of octylphenol, 81 g. of 37% formaldehyde, 13.8 g. of water, 123 g. of oxalic acid, and 0.46 g. of Twitchell's reagent for seven hours under reflux. 192 g. of toluene and 100 g. of water were added, and refluxing was continued for one-half hour. The aqueous layer and the resinous layer were separated and the latter was concentrated by removal of the solvent under reduced pressure. The residue was finally heated for five hours at 250° C. at a pressure of 1.5 mm. of mercury. The product was a soft, viscous material and insoluble in water.

A mixture of 118 g. of octyl phenol-formaldehyde condensation product thus obtained, 1 g. of NaOH, and 100 g. of toluene was heated to 125° to 150° C., in an autoclave. Ethylene oxide was added slowly over a period of two and one-half hours until 261 g. of ethylene oxide were absorbed. This corresponds to 11 mols of ethylene oxide per mol of phenol in the product described in the above. The product was readily soluble in water and had marked detergent properties.

The usefulness of the invention will become obvious from the following two experiments. The beer used in those experiments was obtained from a brewery.

EXPERIMENT 1

PEGPS of three types A, B, C (the details of which are hereinafter described), polyethylene cetyl alcohol ether, Tween 20, and polyethylene glycol (molecular weight: 6,000), respectively in the form of 1 ml. of aqueous solution, were respectively put in standard-sized beer bottles of 633 ml. so that their final concentrations might have the values shown in Table 2. Thereafter, specimens of beer manufactured in a brewery (which beer, after 2 months after-fermentation at 0° C.–1° C. under a pressure of 0.3 atmosphere, had been filtered through silica gel and through cotton to be just ready for bottling and contained 10 µg./ml. of papain) were put in said bottles which were crowned, sterilized at 60° C. and then left to stand for two months at 30° C. and then for 24 hours at 0° C., whereupon their haze was measured in accordance with the method defined by the American Society of Brewing Chemists. The values for haze are indicated in terms of relative values to the control, the stability of beer being improved with increasing value. Head retention tests were made in accordance with A. D. Lundine's method (described in "Journal of the Institute of Brewing," vol. 63, p. 506). Increasing values of head retention Σ indicate improved head retention. In addition, experiments were made on polyethylene cetyl alcohol ether for comparison purposes. The above mentioned compounds A and B refer to the compounds produced according to the Example A previously described herein. A is an addition product prepared by adding about 20 moles of ethylene oxide to a nonyl phenol-formaldehyde condensation product (having a mean degree of condensation of 6), and in B the mean degree of condensation is 12 and the additive amount of ethylene oxide is about 20 moles. The compound C refers to the compound produced according to the Example B previously described herein and is an addition product prepared by adding about 11 moles of ethylene oxide to an octyl phenol-formaldehyde condensation product.

TABLE 2

| Concentration of the substance in beer | µg./ml. | Head retention (Σ) | Relative haze |
|---|---|---|---|
| Control | | 130 | 100 |
| PEGPS A | 10 | 135 | 33 |
| | 20 | 130 | 20 |
| | 50 | 134 | 13 |
| PEGPS B | 10 | 130 | 30 |
| | 20 | 130 | 21 |
| | 50 | 131 | 14 |
| PEGPS C | 5 | 130 | 40 |
| | 10 | 125 | 26 |
| Polyoxyethylene cetyl alcohol ether | 20 | 99 | 50 |
| Tween 20 | 50 | (¹) | 77 |
| Polyethylene glycol | 400 | 125 | 106 |

¹ Too poor to measure.

It is seen that polyethylene glycol has no haze preventive property. Further, polyethylene cetyl alcohol ether and Tween 20, though having a beer haze-preventive property, are so poor in head retention that they cannot be practically used. The compounds A, B and C, even when used in an amount of 20 µg./ml. or less, do not impair the head retention of beer, nor do they detract from the quality of beer.

EXPERIMENT 2

Unmatured beer having just undergone prefermentation in a brewery was put in a 20 l. aluminum cask and then subjected to after-fermentation at 0° C.–1° C. at 0.3 atmosphere for two months. After the beer was subjected to carbonation at 2 atmospheres for 20 minutes, samples of the beer were poured into standard-sized beer bottles of 633 ml. in which said compounds A, B, C, papain and polyethylene glycol had been previously put, respectively, an amount of 1 ml., as in the Experiment 1, the bottle being then crowned, and haze was then measured in accordance with the same method as in the Experiment 1, the test results being shown in Table 3.

TABLE 3

| Concentration of the substance in beer | µg./ml. | Relative haze |
|---|---|---|
| | No additive | 100 |
| PEGPS A | 20 | 40 |
| | 50 | 30 |
| PEGPS B | 20 | 38 |
| | 50 | 29 |
| PEGPS C | 20 | 40 |
| | 50 | 29 |
| Papain | 30 | 55 |
| | 50 | 65 |
| Polyethylene glycol | 400 | 106 |

PEGPS A, B and C of the present invention can each satisfactorily prevent the haze of beer without the use of papain and, moreover, the effectiveness thereof is higher than that of papain Thus, in each of the above Experiments 1 and 2, the present compounds A, B and C possess strong action of stabilizing beer irrespective of the presence of papain. Moreover, they do not impair the head retention of beer, nor do they spoil the flavor. This has been proved by a flavor test conducted by a group of expert tasters. In fact, the tasters could not find any differences in taste between beer without additive and the modified beer. Moreover, as to the results of beer being left to stand at 30° C. for one month, it was found that beer with an additive of PEGPS A, B or C much less smelled of oxides than beer without additive. Further, the present additives are non-toxic and less expensive than papain so that they are practically useful as haze-preventive agents for beer.

Some examples of the invention are given as follows:

Example 1

Just before bottling operation, an aqueous solution of the compound PEGPS B of the invention as described in the above experiments is put in a bottle in an amount of 1 ml. so that the final concentration may be 20µ g./ml., and beer is then packed therein.

Example 2

At the beginning of after-fermentation, papain is added to beer in such an amount that the concentration thereof may be 10µ g./mg. When this beer is put in a bottle, 1 ml. of an aqueous solution of the compound PEGPS B of the invention as described in the above experiments is added to the beer so that the final concentration may be 10µ g./ml.

What we claim is:

1. A method of stabilizing beer which comprises adding to either unmatured beer or beer, at the time of its after-fermentation stage of preparation, an aqueous solution of a high molecular weight alkyl-phenol-formaldehyde condensation product having polyethylene glycol residue in such an effective amount that formation of non-biological haze in beer is prevented, said high molecular weight alkylphenolformaldehyde condensation product having the general formula:

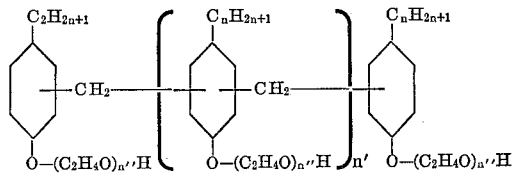

wherein $n$ is an integer having a value of 4 or above, $n'$ is an integer greater than 1, and $n''$ is an integer greater than 7.

2. A method of stabilizing beer as defined in claim 1, in which said high molecular weight alkylphenol-formaldehyde condensation product having polyethylene glycol residue is an addition product produced by adding ethylene oxide to a nonyl phenol-formaldehyde condensation product.

3. A method of stabilizing beer as defined in claim 1, in which said high molecular weight alkylphenol-formaldehyde condensation product having polyethylene glycol residue is an addition product produced by adding ethylene oxide to an octyl phenol-formaldehyde condensation product.

4. A method of stabilizing beer as defined in claim 1, in which said high molecular weight alkylphenol-formaldehyde condensation product having polyethylene glycol residue is one which is obtained by passing ethylene oxide at 50° C. to 200° C. in the presence of a small amount of catalyst through an anhydrous solution of a high molecular weight alkylphenol-formaldehyde condensation product.

5. A method of stabilizing beer as defined in claim 4, in which a saturated hydrocarbon substitution radical having 8 to 18 carbon atoms is used as the alkyl radical of alkylphenol.

6. A method of stabilizing beer which comprises adding to unmatured beer or beer, at the time of its after-fermentation stage of preparation, an aqueous solution of a high molecular weight alkylphenol-formaldehyde condensation product having polyethylene glycol residue in such an effective amount that formation of non-biological haze in beer is prevented, said high molecular alkylphenol-formaldehyde condensation product having the general formula:

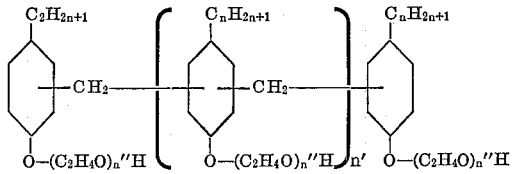

wherein $n$ is an integer having a value of 8 to 18, $n'$ is an integer having a value of 2 to 20, and $n''$ is an integer having a value of 10 to 40.

7. A method of stabilizing beer which comprises adding to unmatured beer or beer, at the time of its after-fermentation stage of preparation, a protease having beer haze-preventive action, together with a high molecular alkylphenol-formaldehyde condensation product having polyethylene glycol residue in such an effective amount that the formation of non-biological haze in beer is prevented, said high molecular alkylphenol-formaldehyde condensation product having the general formula:

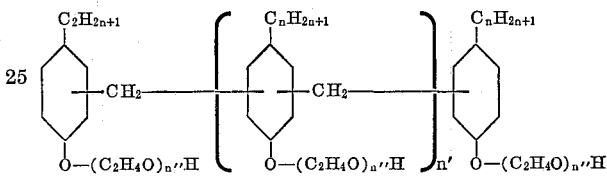

wherein $n$ is an integer having a value of 4 or above, $n'$ is an integer greater than 1, and $n''$ is an integer greater than 7.

8. A method of stabilizing beer as defined in claim 7, in which the protease is papain.

References Cited
UNITED STATES PATENTS 2,942,980 6/1960 Segel et al. _____ 99—48
3,095,358 6/1963 Meister _____ 99—48

LIONEL M. SHAPIRO, Primary Examiner

D. M. NAFF, Assistant Examiner